United States Patent
Lin (10) Patent No.: US 9,382,895 B2
(45) Date of Patent: Jul. 5, 2016

(54) SELF-POSITIONING DEVICE FOR WATER TURBINE

(71) Applicant: KUN SHAN UNIVERSITY, Tainan (TW)

(72) Inventor: Shueei-Muh Lin, Tainan (TW)

(73) Assignee: Kun Shan University, Tainan (TW)

( * ) Notice: Subject to any disclaimer, the term of this patent is extended or adjusted under 35 U.S.C. 154(b) by 782 days.

(21) Appl. No.: 13/732,459

(22) Filed: Jan. 2, 2013

(65) Prior Publication Data
US 2014/0186179 A1 Jul. 3, 2014

(51) Int. Cl.
*F03B 13/10* (2006.01)
*F03B 13/26* (2006.01)
*F03B 17/06* (2006.01)

(52) U.S. Cl.
CPC ........... *F03B 17/061* (2013.01); *F05B 2240/97* (2013.01); *Y02E 10/28* (2013.01)

(58) Field of Classification Search
USPC ............................................................ 415/8
See application file for complete search history.

(56) References Cited

U.S. PATENT DOCUMENTS

| 6,091,161 A * | 7/2000 | Dehlsen | B63G 8/18 290/43 |
|---|---|---|---|
| 2008/0232965 A1* | 9/2008 | Fraenkel | F03B 17/061 416/85 |
| 2009/0140524 A1* | 6/2009 | Kejha | F03B 17/061 290/54 |
| 2011/0095530 A1* | 4/2011 | Blumer | F03B 17/061 290/43 |

* cited by examiner

*Primary Examiner* — Nathaniel Wiehe
*Assistant Examiner* — Jason Davis
(74) *Attorney, Agent, or Firm* — Rosenberg, Klein & Lee (57) ABSTRACT

A water generator assembly includes a water generator having two forwarding wings on the front end thereof and the forwarding wings are applied by current and generate a resistance force and a lifting force. The resistance force and the lifting force are combined as a composition force which has a forwarding component force in the X-axis to offset the drag force cause by the current applying to the water generator. A component force in Y-axis is offset by the forwarding wings. A balance wing is connected to the water generator to prevent the water generator from spinning about the X-axis. The water generator has a lifting wing to generate a lifting force to lift the water generator. A buoyant floats and indexes the water generator. A tail wing and two side wings keep the water generator facing the current and prevent the water generator from spinning about the Y-axis.

9 Claims, 9 Drawing Sheets

SELF-POSITIONING DEVICE FOR WATER TURBINE

FIELD OF THE INVENTION

The present invention relates to a self-positioning device, and more particularly, to a self-positioning for positioning the water turbine in the open ocean without using tower stands on the sea bed.

BACKGROUND OF THE INVENTION

The conventional ocean has potential hydrokinetic energy because the current of the ocean has stable speed and direction. For example, the Kuroshio current flows toward north consistently and the speed is about 1 m/s at the distance about 1 km from Taiwan, and the width is about 150 km. If a two-blade turbine ocean current generator of 1 MW is set offshore from the island of Lyudao about 3 kin, there is an area about 25 square km where the Kuroshio current has the highest current speed. The two-blade turbine ocean current generator is estimated to generate energy of 1 GW to 3 GW, and which is equal to the designated amount of power of three nuclear power plants. Furthermore, ocean current generator is more environmentally-friendly when compared with the existed power plants using nuclear power. Therefore, the use of ocean current is intensively studied and becomes the main stream of study for getting energy from the natural sources.

Figure 1:
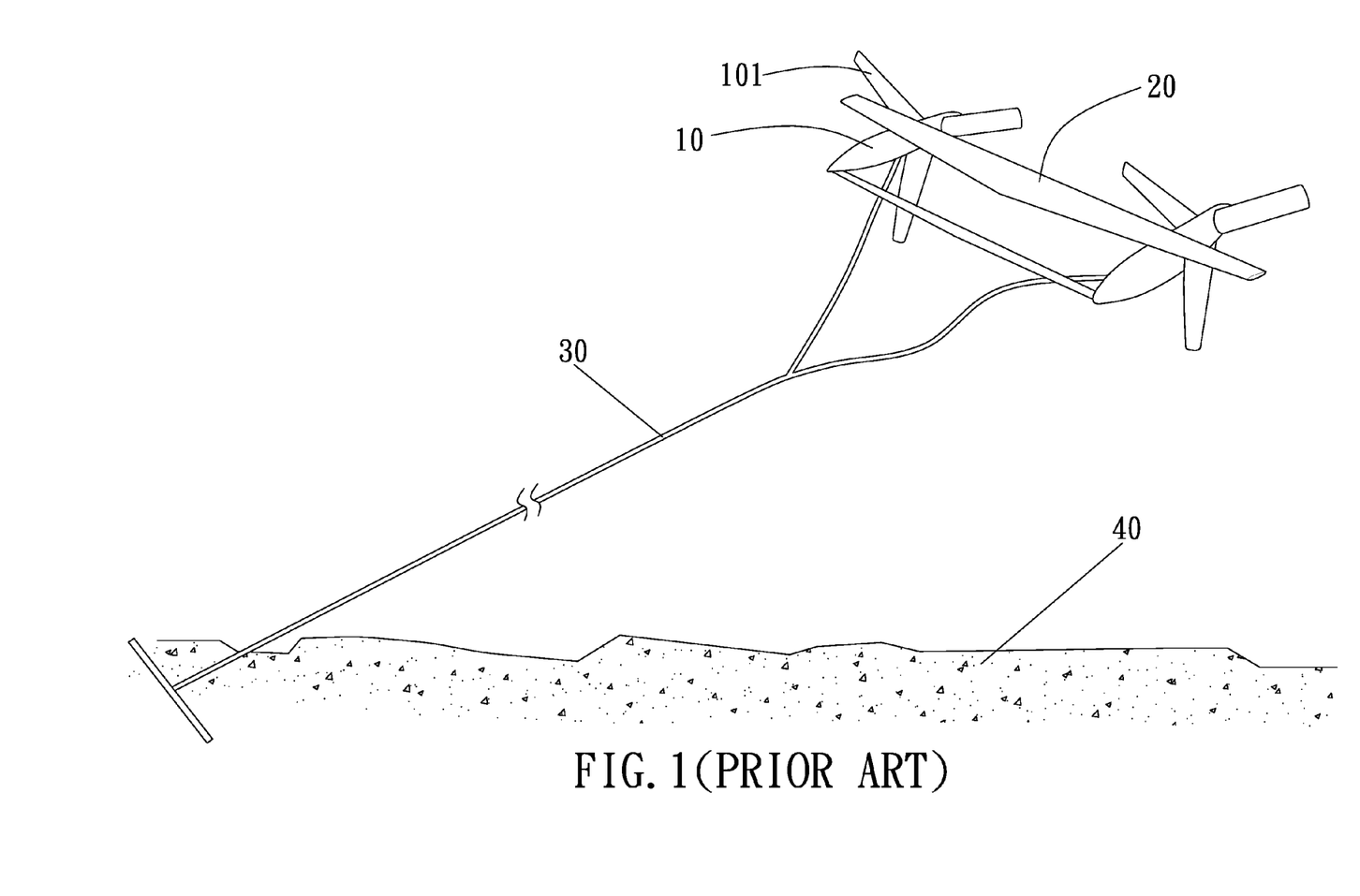
FIG. 1 illustrates the conventional water generator assembly.

FIG. 1 shows the conventional water turbine and comprises two sets of generators 10 and each of which has at least one blade 101, two lifting wings 20 are connected between the two sets of generator 10. A cable 30 is connected between the generators 10 and the sea bed 40. The blades 101 rotate by the current to generate electric power. The current passes the lifting wings 20 to keep the generators 10 to be lifted and maintained at the effective area. The cable 30 ensures that the generators 10 are positioned within the effective area. However, the cable 30 can only position the generators 10 in shallow area, when the depth of the ocean is over 200 meters, the sea bed 40 is thousands of meters from the water surface. Therefore, the conventional generators can only be set close to the land and the current speed is too slow to effectively drive the generators 10. The depth of the ocean at the east coast of Taiwan is about 1000 to 4000 meters, and it is difficult to fix the cable 30 on the sea bad 40. The maintenance will be difficult when the climate conditions become bad. Typhoons can easily damage the generators 10 and the blades 101 are difficult to face the currents because the currents have different directions so that the efficiency of the generators 10 is low. The lifting force of the lifting wing 20 is affected by the density of the water and the speed, and the density and speed change along with time, so that the generators 10 may not be located at desired positions.

Figure 2:
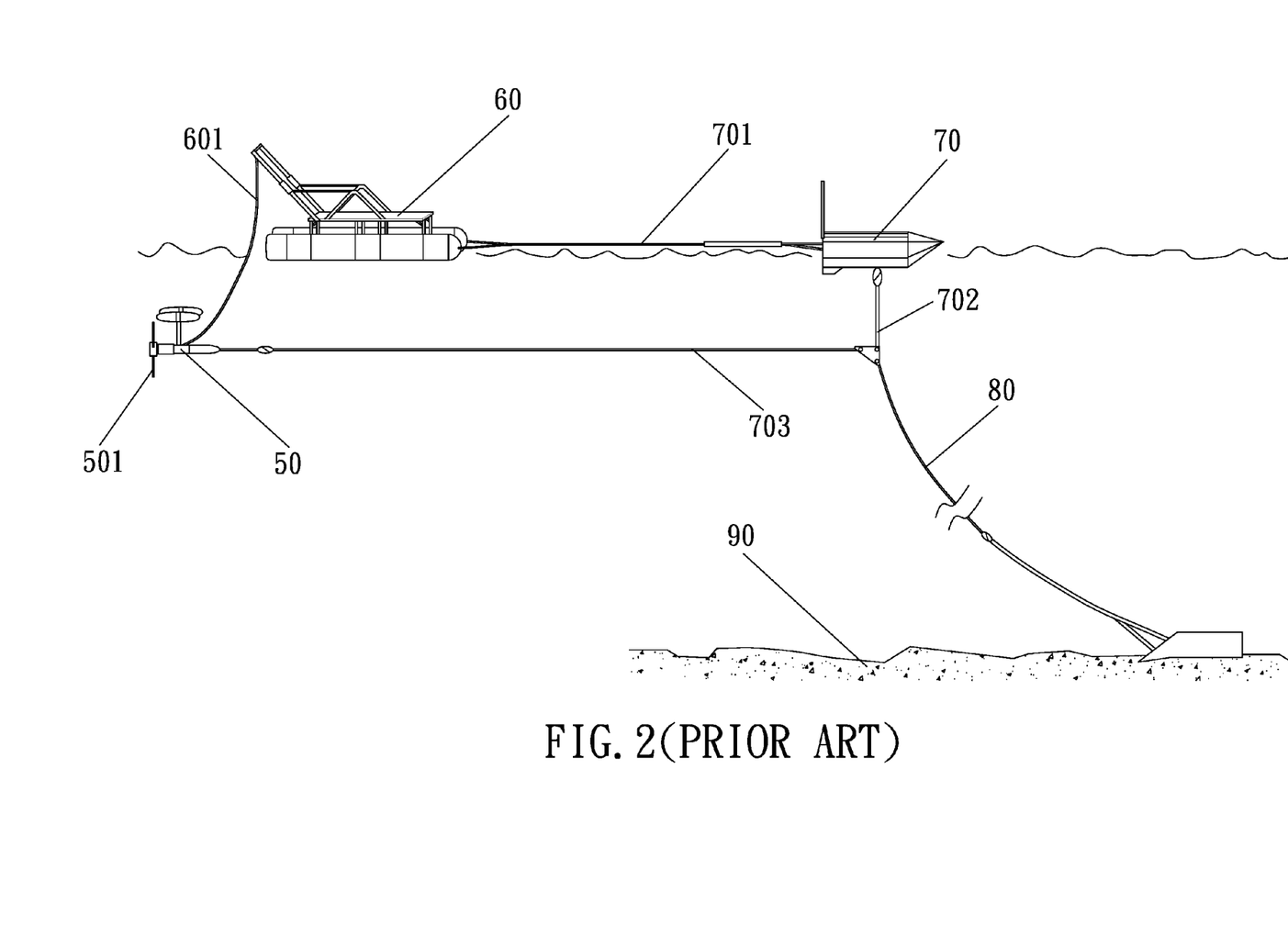
FIG. 2 shows the conventional ocean turbine generator.
Figure 3:
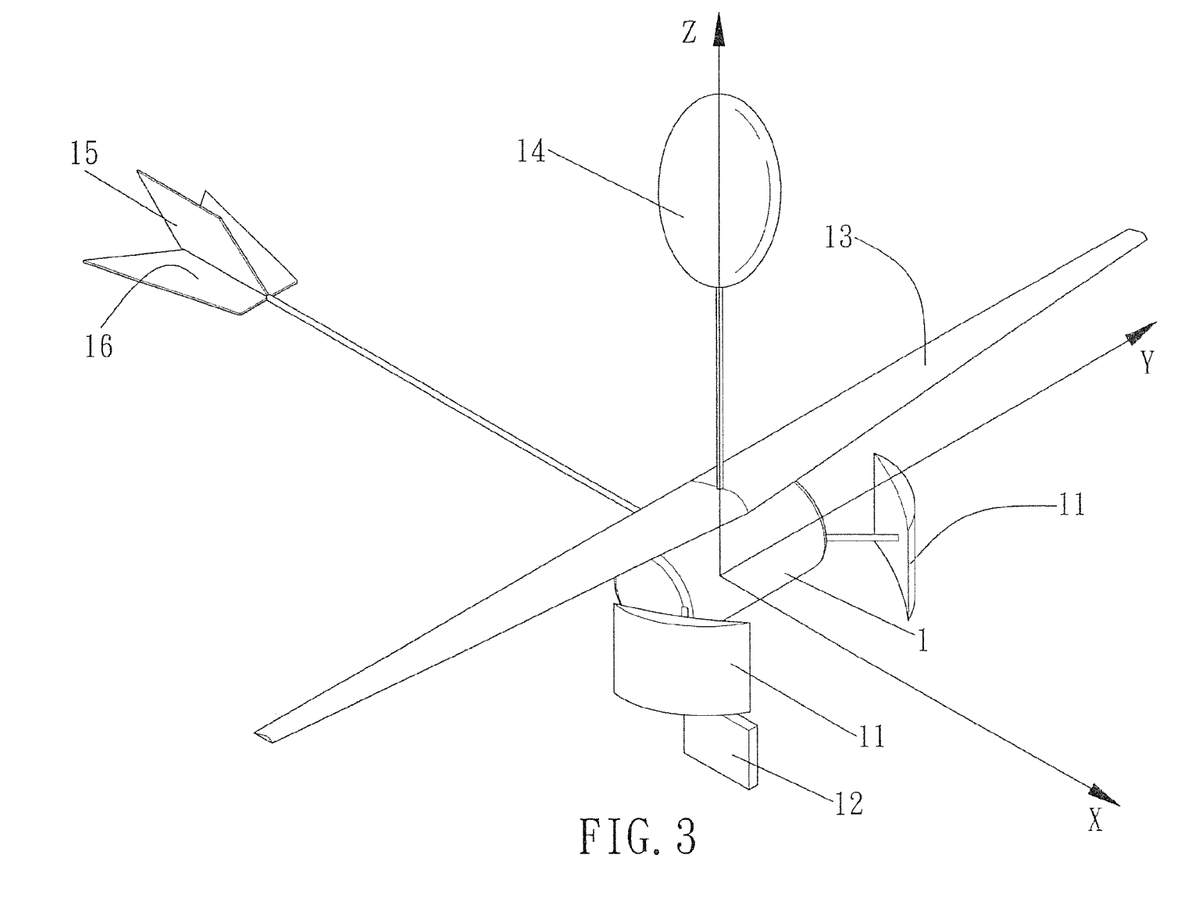
FIG. 3 is a perspective view to show the water generator assembly of the present invention.

FIG. 2 discloses a conventional turbine generator 50 with multiple blades 501. A power retrieving station 60 floats on the surface and has a positioning cable 601 which is connected to the turbine generator 50. A buoyant 70 is connected in parallel to the power retrieving station 60 by a fixing cable 701. The buoyant 70 has an indexing device 702 which is connected in parallel to the turbine generator 50 by a cable 703. A cable 80 is connected between the indexing device 702 and the sea bed 90. The power retrieving station 60 and the buoyant 70 float on the water surface to maintain the turbine generator 50 so that the turbine generator 50 is located in the effective area where the current is usable. The sea bad 90 at the deep ocean makes the installation and maintenance be a huge task. The bad climate can easily damage the turbine generator 50 and the change of the current affects the efficiency of the turbine generator.

The present invention intends to provide a self-positioning device for water generators and improves the shortcomings of the conventional ones.

SUMMARY OF THE INVENTION

The present invention relates to a water generator assembly and comprises a water generator having two forwarding wings on the front end thereof and the forwarding wings are located on the X-axis of the water generator. The forwarding wings are applied by current and generate a resistance force and a lifting force. The resistance force and the lifting force are combined as a composition force which has a forwarding component force in the X-axis so as to offset the drag force cause by the current applying to the water generator, and a component force in Y-axis. The component force in the Y-axis is offset by the forwarding wings.

Preferably, the water generator has a balance wing which prevents the water generator from spinning about the X-axis.

Preferably, the water generator has a lifting which generates a lifting force to lift the water generator.

Preferably, the water generator has a buoyant which provides floating force and indexes the water generator.

Preferably, a tail wing is connected to the water generator and located in opposite to the forwarding wings, the tail wing keeps the water generator facing the current.

Preferably, a side wing is connected to the water generator and located in opposite to the forwarding wings, the side wings prevent the water generator from spinning about the Y-axis.

The current passes the forwarding wings and generates pressure difference between the two sides of the forwarding wings, the pressure difference generates a composition force which is composed of the resistance force and the lifting force. The composition force has a forwarding component force in the X-axis so as to offset the drag force cause by the current applying to the water generator so that the water generator does not moved back and forth, and the water generator always faces the current to be functioned normally. Therefore, the present invention can be used in different areas of the sea to generate power. The composition force has a component force in Y-axis and the component force in the Y-axis is offset by the forwarding wings.

By the tail wing, the balance wing and the side wings, the present invention is stable and floats in the water, and the present invention does not spin about the X-axis and the Y-axis. By the lifting wing and the buoyant, the present invention is positioned at a desired depth in the water, and is indexed so as to consistently and effectively function as desired. The self-positioning device does not need cables or tower to position the water generator to the sea bed, and the water generator can be used in different areas of the ocean. The installation and retrieval of the generator is simple and easy, the water generator can be quickly retrieved when the climate conditions become bad so as to reduce the maintenance fee and protect the water generator.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 3 to 7, the water generator assembly of the present invention comprises a water generator 1 having two forwarding wings 11 on the front end thereof and the forwarding wings 11 are located on the X-axis of the water generator 1. The forwarding wings 11 are designed by the principles of sailing against current, the forwarding wings 11 are applied by the current and generating a resistance force $F_D$ and a lifting force $F_L$, the resistance force $F_D$ and the lifting force $F_L$ are combined as a composition force $F_C$ which has a forwarding component force $F_F$ in the X-axis so as to offset the drag force cause by the current applying to the water generator 1, and a side component force $F_S$ in Y-axis of the water generator 1 is offset by the forwarding wings 11.

The water generator 1 has a balance wing 12 which prevents the water generator 1 from spinning about the X-axis.

The water generator 1 has a lifting wing 13 which generates a lifting force to lift the water generator 1 which floats in the water.

The water generator 1 has a buoyant 14 which provides floating force and indexes the water generator 1.

A tail wing 15 is connected to the water generator 1 and located in opposite to the forwarding wings 11, the tail wing 15 keeps the water generator 1 facing the current.

A side wing 16 is connected to the water generator 1 and located in opposite to the forwarding wings 11, the side wings 16 prevent the water generator 1 from spinning about the Y-axis.

Figure 8:
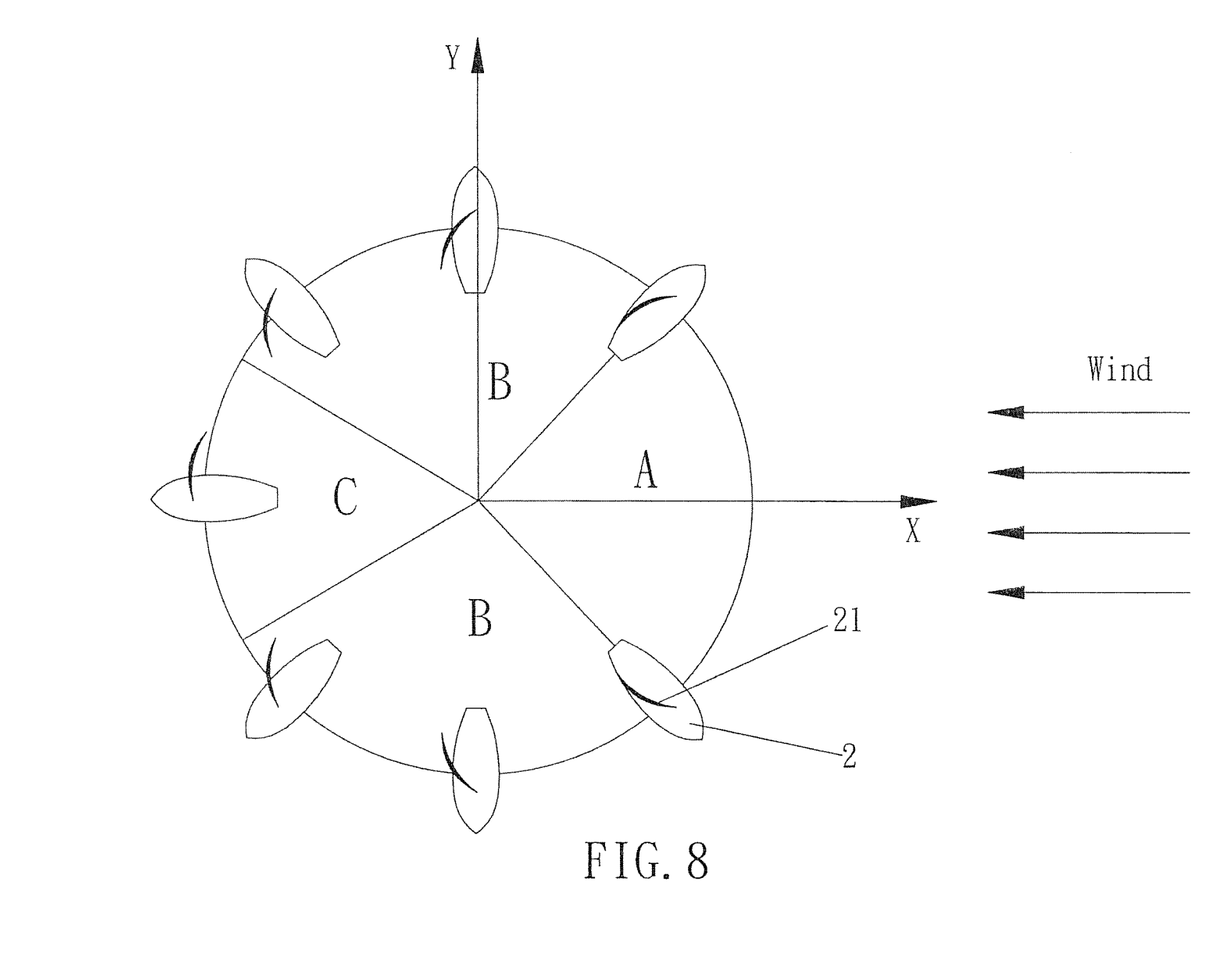
FIG. 8 illustrates relationship between the wind directions and the moving direction of the sailboard.
Figure 9:
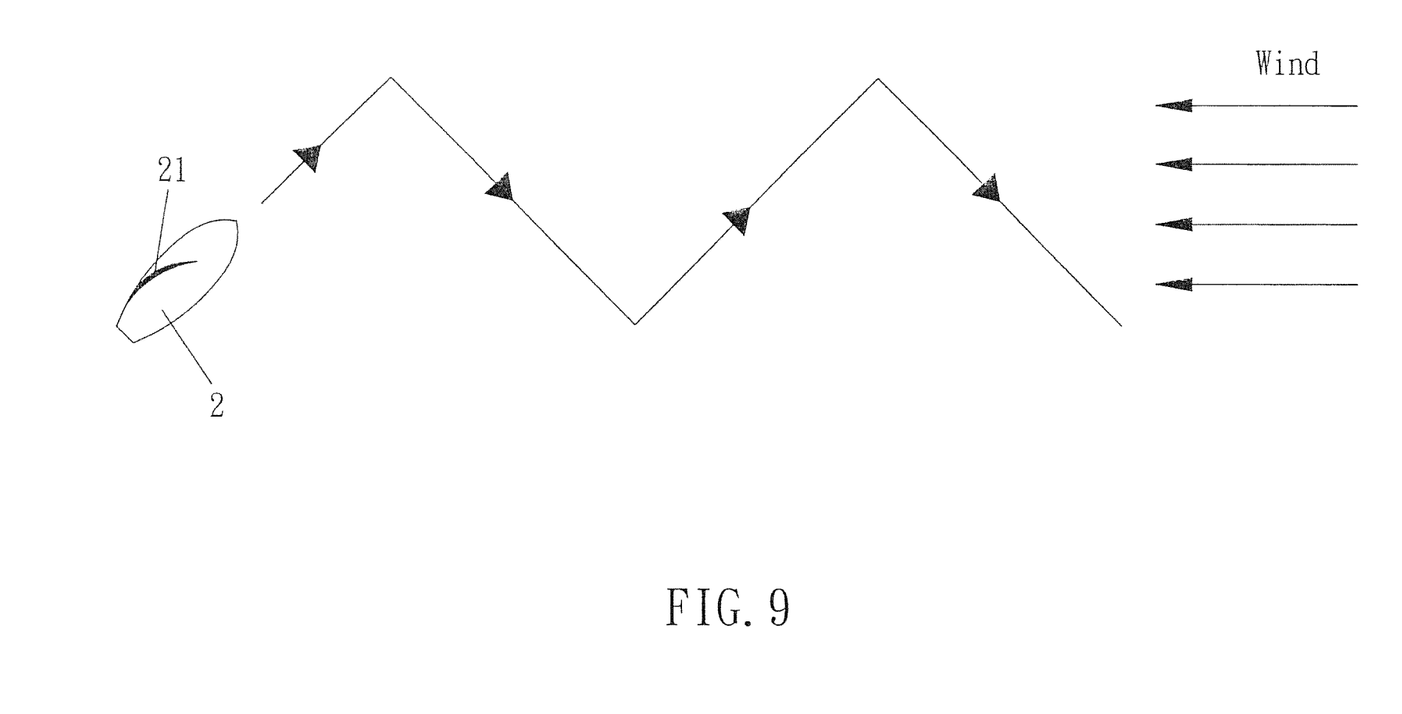
FIG. 9 illustrates the moving direction of the sailboard against the wind.

As shown in FIG. 8, taking the sailboat 2 as an example, according the Bernoulli's principle, the wind passes the sail 21 of the sailboat 2 and generates pressure difference on the two opposite sides of the sail 21, the pressure difference generates a force to move the sailboat 2 forward. Therefore, the direction of the wind affects the moving direction of the sailboat 2 in the areas A, B and C. If the wind blows the sail 21 at plus or minus 45 degrees it cannot generate effective force to move the sailboat 2 forward such as shown for the sailboat 2 in the area A. On the contrary, if the wind direction is the same as the moving direction of the sailboat 2, the Bernoulli's principle is no longer available, the sailboat 2 is not stable in moving forward. The sailboat 2 in the area B has the best result of moving forward. The trace of the sailboat 2 against the wind direction is illustrated in FIG. 9.

Figure 4:
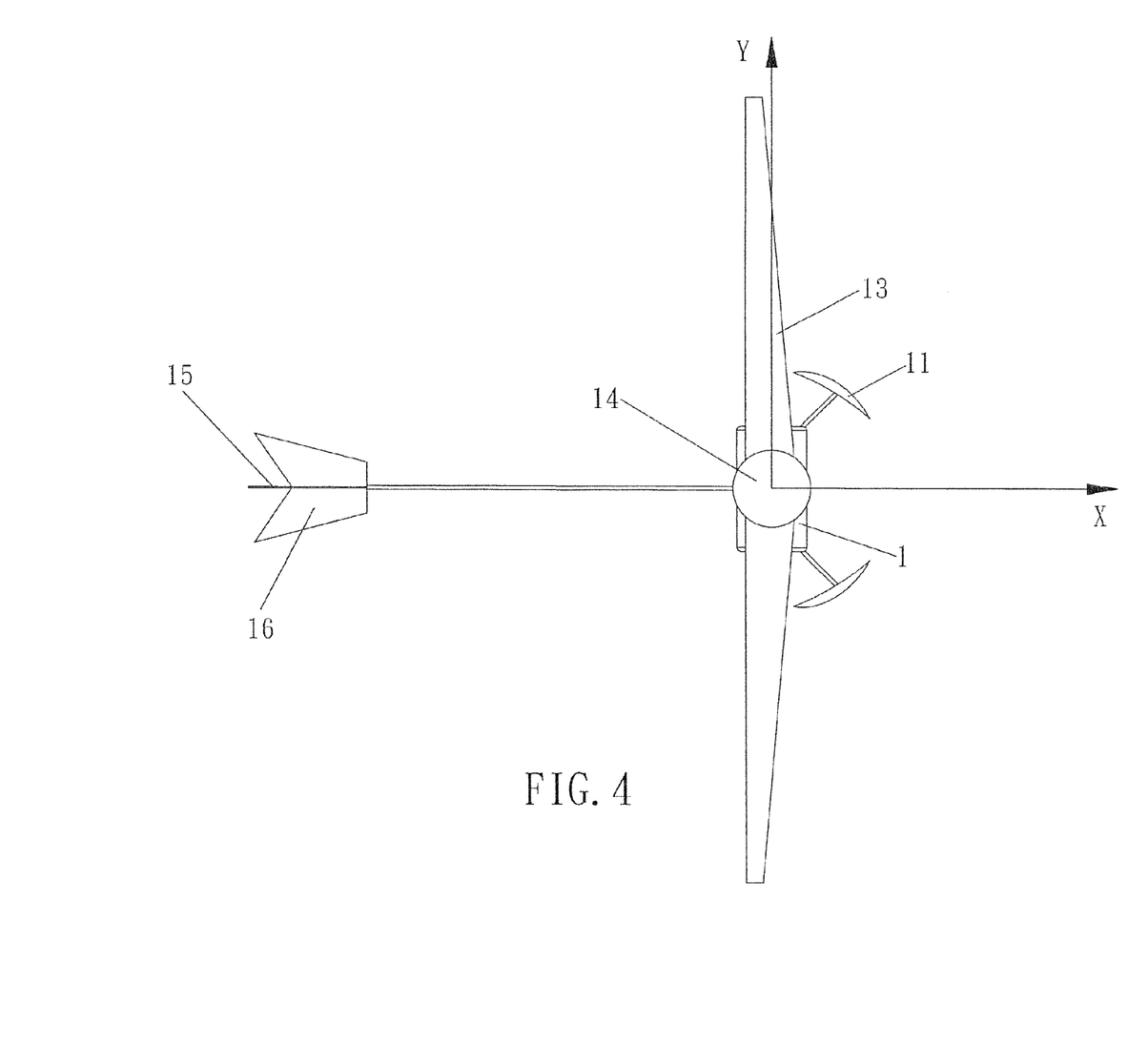
FIG. 4 is a top view to show the water generator assembly of the present invention.
Figure 5:
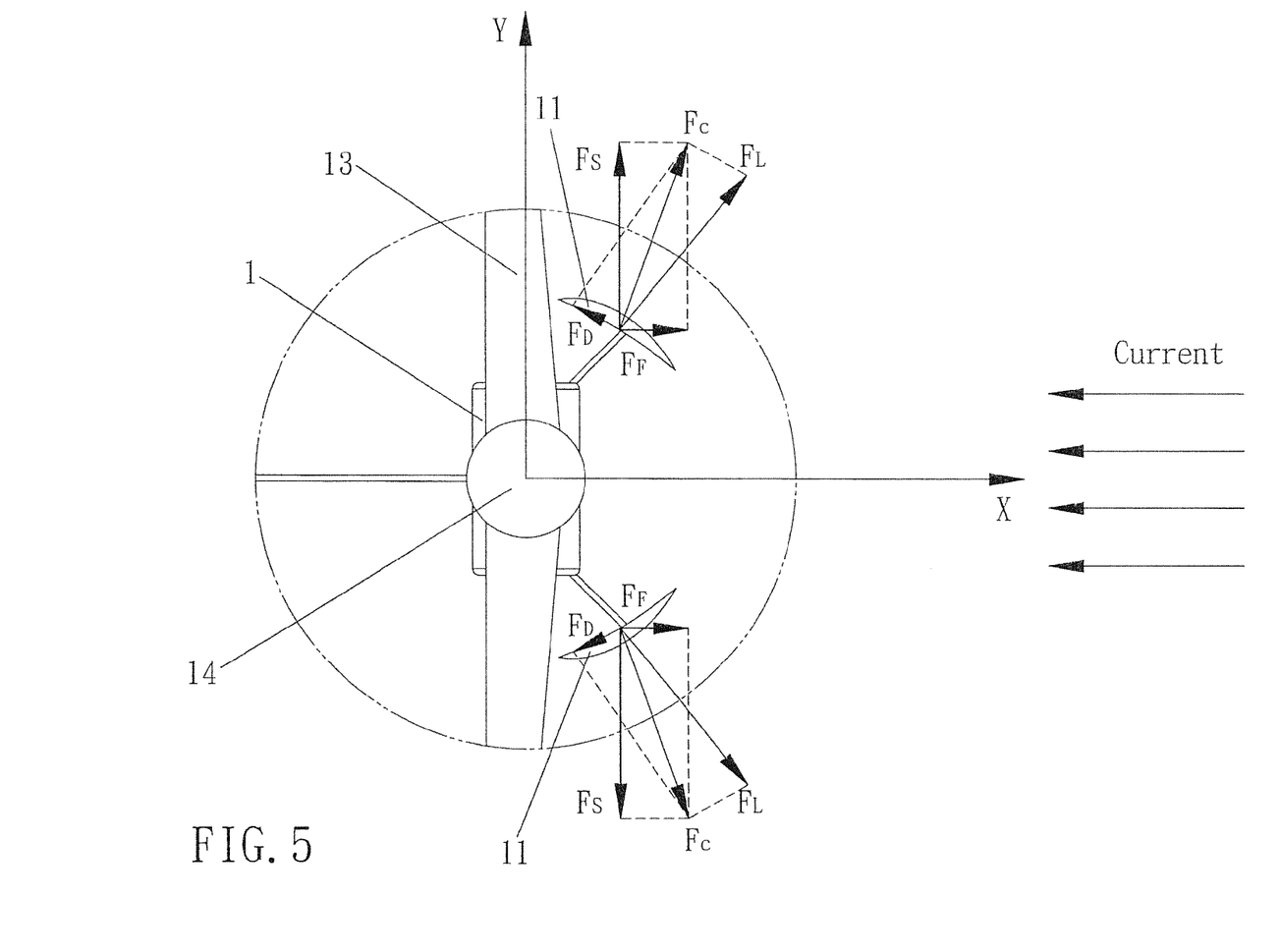
FIG. 5 shows that current passes the forwarding wings and generates component forces in X-axis and Y-axis.

As shown in FIGS. 4 and 5, by the Bernoulli's principle, the current the passes one of the forwarding wings 11 and generates pressure difference on the two opposite sides of the forwarding wing 11, the pressure difference generates a resistance force $F_D$ and a lifting force $F_L$, the resistance force $F_D$ and the lifting force $F_L$ are combined as a composition force $F_C$ which has a forwarding component force $F_F$ in the X-axis so as to offset the drag force cause by the current applying to the water generator 1 so that the water generator 1 does not move back and forth. There are two forwarding wings 11, the forwarding component force $F_F$ in the X-axis is doubled to effectively offset the drag from the current. The composition force $F_C$ has a component force $F_S$ in Y-axis of each forwarding wing 11, the two component forces $F_S$ has the same amount and in opposite directions, so that the two component forces $F_S$ are offset to each other and the water generator 1 is positioned and does not shift left and right.

Figure 6:
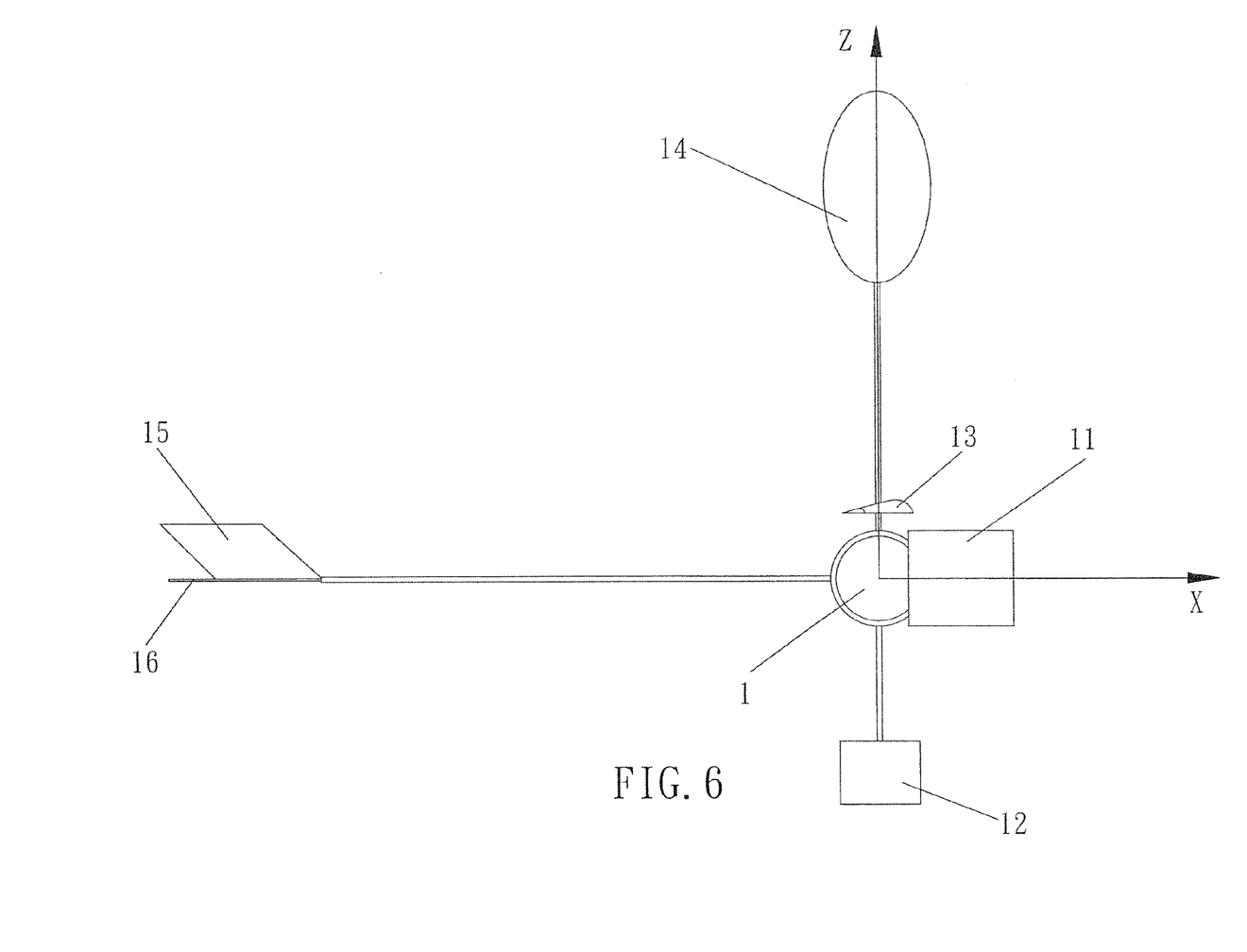
FIG. 6 is a side view to show the water generator assembly of the present invention.

As shown in FIG. 6, when the current passes the lifting wing 13, according to the Bernoulli's principle, the two respective speeds of the current at the top end and the bottom end of the lifting wing 13 are different so as to form a lifting force to let the water generator 1 float. The buoyant 14 provides an additional floating force so that the water generator 1 floats at desired position. Besides, the buoyant 14 provides an index for the water generator 1 so that the users can easily find and retrieve the water generator 1.

Figure 7:
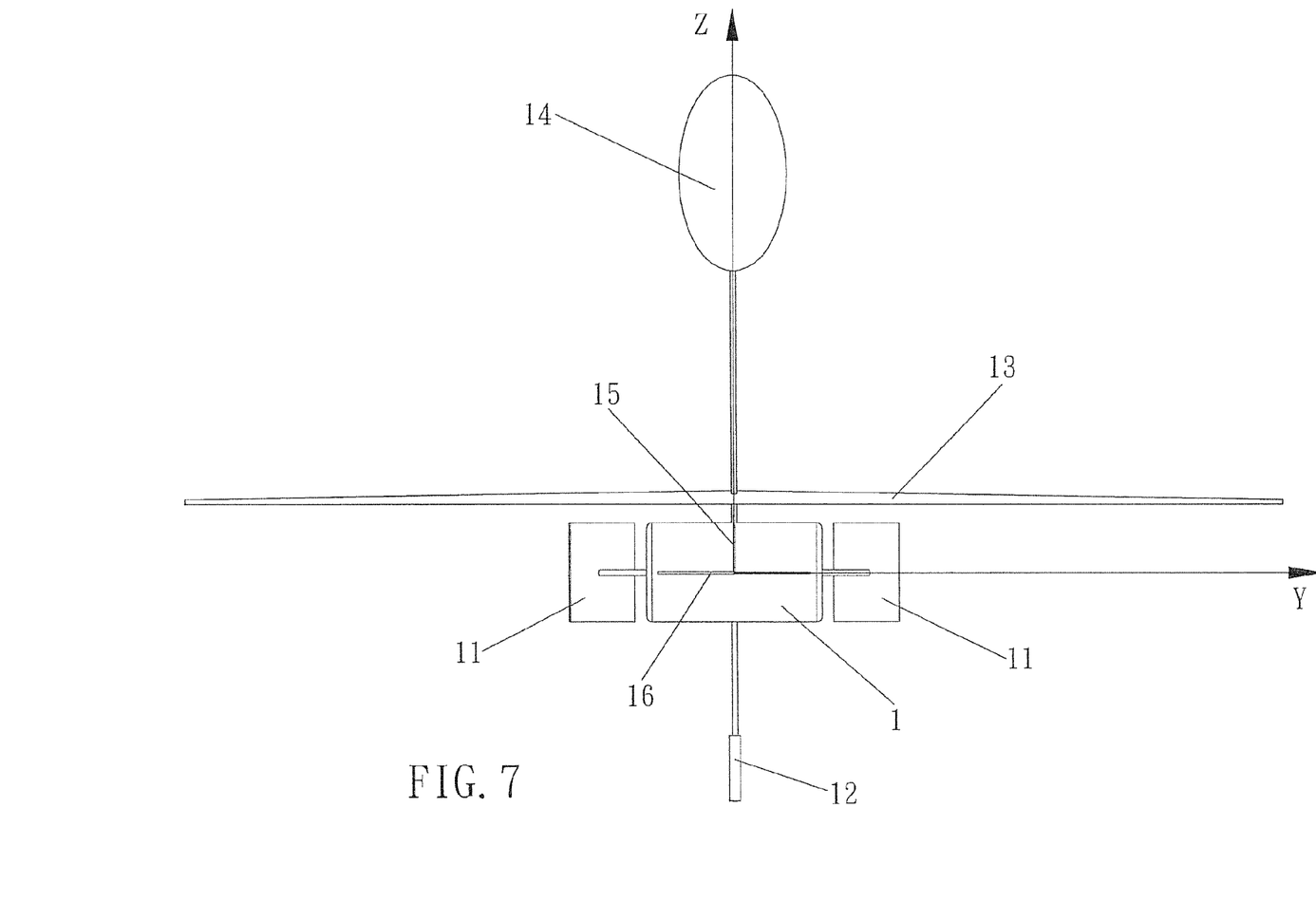
FIG. 7 is a rear end view to show the water generator assembly of the present invention.

As shown in FIG. 7, because the direction and speed of the current change in different period of each day, the balance wing 12 and the side wings 16 prevent the water generator 1 from spinning about the X-axis and the Y-axis. The top tail wing 15 keeps the forwarding wings 11 and the water generator 1 to face the current to increase the efficiency of power generation of the water generator 1.

The present invention has the following advantages:

1. The forwarding wings 11 ensure that the water generator 1 to be positioned and does not move back and forth. The top tail wing 15 keeps the water generator 1 to face the current to increase the efficiency of power generation of the water generator 1. The lifting wing 13 and the buoyant 14 make the water generator 1 float at desired position. The present invention does not need cables or tower to be fixed to the sea bed and the installation of the water generator 1 is not restricted by the terrace of the sea bed, so that the present invention can be used in different positions of the sea and effectively operated with low cost and low impact to the environment.

2. By the balance wing 12 and the side wings 16, the water generator 1 is prevented from spinning about the X-axis and the Y-axis, and this also prevents the water generator 1 from flipping over in the water so as to constantly function.

3. The present invention does not need cables or tower to be fixed to the sea bed so that the installation cost is much lower than the conventional way and the present invention can be quickly retrieved when the climate conditions turn bad. When in retrieving the present invention, the buoyant 14 provides a visible and clear positioning index which is convenient for the users to track, observe and retrieve.

While we have shown and described the embodiment in accordance with the present invention, it should be clear to those skilled in the art that further embodiments may be made without departing from the scope of the present invention.

What is claimed is:

1. A water generator assembly comprising:
   a water generator having two forwarding wings on a front end thereof and the forwarding wings located on an X-axis of a forward direction of the water generator, the two forwarding wings being mirror symmetrical to each other, the forwarding wings being applied by current against the forwarding wings in the X-axis, and generating a resistance force and a lifting force in an X-Y plane, the resistance force and the lifting force being combined as a composition force which has a forwarding component force in the X-axis so as to offset a drag force caused by the current applying to the water generator, a component force in Y-axis of the water generator being offset by the forwarding wings;

wherein a tail wing is connected to the water generator and located in opposition to the forwarding wings, the tail wing keeps the water generator facing the current.

2. The assembly as claimed in claim 1, wherein the water generator has a balance wing which prevents the water generator from spinning about the X-axis.

3. The assembly as claimed in claim 1, wherein the water generator has a lifting wing which generates a lifting force to lift the water generator.

4. The assembly as claimed in claim 1, wherein the water generator has a buoyant which provides floating force and indexes the water generator.

5. The assembly as claimed in claim 1, wherein a side wing is connected to the water generator and located in opposition to the forwarding wings, the side wings prevent the water generator from spinning about the Y-axis.

6. A water generator assembly comprising:

a water generator having two forwarding wings on a front end thereof and the forwarding wings located on an X-axis of a forward direction of the water generator, the two forwarding wings being mirror symmetrical to each other, the forwarding wings being applied by current against the forwarding wings in the X-axis, and generating a resistance force and a lifting force in an X-Y plane, the resistance force and the lifting force being combined as a composition force which has a forwarding component force in the X-axis so as to offset a drag force caused by the current applying to the water generator, a component force in Y-axis of the water generator being offset by the forwarding wings;

wherein a side wing is connected to the water generator and located in opposition to the forwarding wings, the side wings prevent the water generator from spinning about the Y-axis.

7. The assembly as claimed in claim 6, wherein the water generator has a balance wing which prevents the water generator from spinning about the X-axis.

8. The assembly as claimed in claim 6, wherein the water generator has a lifting wing which generates a lifting force to lift the water generator.

9. The assembly as claimed in claim 6, wherein the water generator has a buoyant which provides floating force and indexes the water generator.

* * * * *